Aug. 4, 1931.  O. L. MILLS  1,817,092
ELECTRIC WELDING PROCESS
Filed Nov. 9, 1928
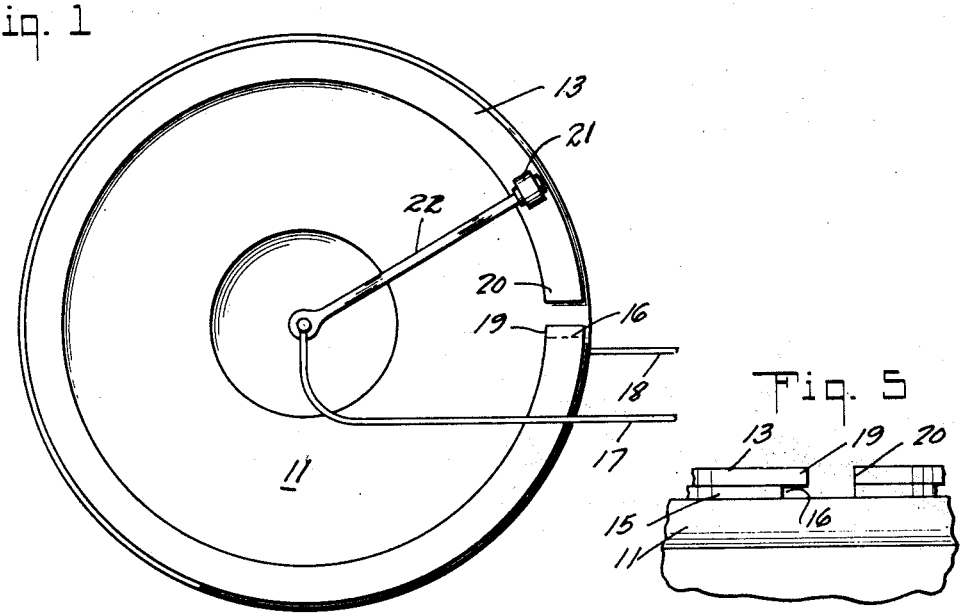
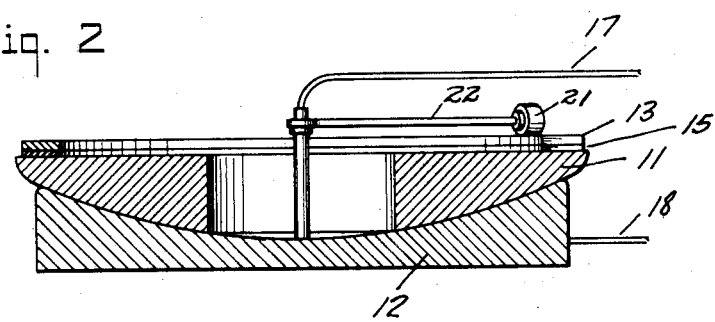
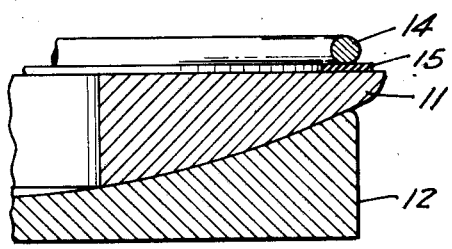
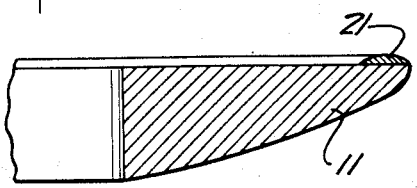
INVENTOR
Oscar L. Mills
BY John Flam
ATTORNEY Patented Aug. 4, 1931

1,817,092

UNITED STATES PATENT OFFICE

OSCAR L. MILLS, OF LOS ANGELES, CALIFORNIA

ELECTRIC WELDING PROCESS

Application filed November 9, 1928. Serial No. 318,218.

It is often desirable to fuse a metal onto a metallic member; for example, to provide a high speed cutting edge on tools, such as oil well drill discs or the like. It is also often desirable to unite metallic members by a molecular union with a fused metal. All these effects have been produced by welding, one form of which involves the application of an electric arc to supply the necessary heat. In such cases, one of the electrodes for the arc is usually formed by the material to be deposited, and the other electrode is formed by the metal member or members that are to unite with said material.

It is one of the objects of my invention to provide a simple method for such arc welding, that ensures a uniform weld without the requirement of a great degree of care or skill on the part of the operator.

It is another object of my invention to improve in general on the process described and claimed in an application filed August 22, 1928, in the name of Joseph V. Quinn, having Serial No. 301,203, and entitled "Process of welding"; of which application I am a part assignee.

My invention possesses many other advantages, and has other objects which may be made more easily apparent from a consideration of one embodiment of my invention. For this purpose I have shown a form in the drawings accompanying and forming part of the present specification. I shall now proceed to describe this form in detail, which illustrates the general principles of my invention; but it is to be understood that this detailed description is not to be taken in a limiting sense, since the scope of my invention is best defined by the appended claims.

Referring to the drawings:

Figure 1 is a diagrammatic plan view of a welding set-up with which my process can be practiced;

Fig. 2 is a sectional view thereof;

Fig. 3 is an enlarged fragmentary sectional view of a modified set-up;

Fig. 4 is a fragmentary sectional view of a metallic member after the welding thereon is completed; and Fig. 5 is a detail front view of the device shown in Fig. 1.

In the present instance I show my process as applied to a cutting tool, such as a rotary drill disc 11, to the face of which it is desired to weld a band of wear resisting metal, such as a tungsten or a chrome alloy. I show the disc 11 as set into a support 12 of metal.

The material to be welded to the flat upper face of the member 11 can be placed as a band 13 over the member 11, which band is not quite closed. This material can be in the form of a welding composition, made up for example of a mixture of granular particles of the alloy, and held together by a binder, such as flour paste, glue, or the like. Such compositions are disclosed in several of my prior patents and applications; for example, in my Patent #1,650,905; and also in my application, Serial #242,988, filed December 28, 1927. The material to be welded, however, can be in the form of a solid rod or wire 14, as disclosed in Fig. 3.

The arrangement is such that the welding arc progresses from one end of the band 13 to the other end, the welding taking place in sequence along the length of the band. For this purpose I interpose a layer 15 of insulation between the band 13 or 14 and the work 11. This insulation extends entirely around the band 13 or 14, except for a short distance from one end 19 of the band (Fig. 5). The end of the insulation layer 15 is indicated at 16.

Now if a sufficient potential difference be applied between band 13 and the work 11 (as by the aid of connections 17, 18), an arc will form between the end 19 of the band and the upper surface of the work 11, because there is a clear space between this end 19 and the work. This arc not only fuses the exposed end of band 13, but also burns away the contiguous insulation 15, thereby exposing more of the material in band 13 opposite the surface of work 11. This burning away of the insulation continues until the entire band 13 is operated upon by the arc. The position of the arc in the instance shown, progresses in a clockwise direction from end 19 clear to the other end 20.

Connection 17 can extend to a conducting roller 21 insulatingly supported on an arm 22 that can be moved in a circle so as to place roller 21 in contact with the top surface of layer 13. Thus when the welding operation begins, this roller 21 can be placed near end 19, and as the arc progresses around the band 13, the arm 22 can be moved to keep roller 21 just in advance of the arc.

The same action takes place in the form shown in Fig. 3; except that layer 15 can preferably include a fluxing material to produce a good fusion of the fused parts of ring 14 as the arc progresses and burns away this insulation 15. In either case, the final result is indicated in Fig. 4, the raised band 21 showing the deposited and fused material corresponding to band 13 or wire 14.

In the form shown in Fig. 1, the band 13 can be applied over the insulation 15 in a moist or plastic condition; then the ends of the band can be separated by wiping off a section of the plastic band to form the separated ends 19, 20. The work 11 with the plastic band can be placed in a drying or baking oven to harden the band prior to the actual welding operation. To facilitate the formation of the plastic band prior to baking, a disc of cardboard or other solid material can be placed over the work 11, which just exposes the edge of the work for a width corresponding to the width of band 13. The plastic material can then be levelled off with this disc, which is then removed, leaving the raised band 13.

The welding composition used for band 13 preferably includes a carbonaceous binder as hereinbefore mentioned, together with the granular material that enters into the weld to form the welded ring 21. The granular material may be any of several kinds, or mixtures thereof, all mixed with the binder, as for example when an alloy is to be formed.

The insulation layer 15 can be liquid or paste or cloth, or the like. In case a bare wire 14 is used for the welding process, as in Fig. 4, this layer 15 can include further desirable elements, such for example as yield carbon on application of the arc. Such material can be, for example, tire tape, such as cloth treated with an insulating material, or mica, or asbestos. The wire 14 is of course formed of the metal or alloy that is to be deposited. In either of the cases illustrated in Figs. 1 and 2, the material entering into the weld can be deposited in a bare condition directly over the intervening layer of insulation.

Due to the fact that the insulation 15 accurately and uniformly spaces the work from the fusible electrode 13 or 14, the difficulty usually encountered of maintaining a constant arc length during welding, is obviated. This advantage results from the fact that the whole of the electrode to be welded is placed in welding position over the work before welding; and is not moved along and downwardly toward the work as it is consumed (which is characteristic of the prior art).

I claim:

1. The process of welding conducting members together by the aid of an electric arc, which comprises placing a layer of insulation material on one member along the length of the desired weld, placing a bare length of the material to be welded over the insulation layer and in such manner that one end of said bare length projects slightly beyond the length of the layer of insulation, and arcing between said projecting end and the said one member, said insulation being of such a nature that it is eliminated by the heat of the arc.

2. The process of electric arc welding, which comprises placing a layer of insulation along the length of the desired weld, said insulation being capable of elimination by the action of an arc, forming a welding composition over the layer and in such manner that it projects beyond the layer at one end, and applying an electric arc between said projecting end and the member to which the weld is to be applied, whereby the arc progresses as the composition fuses, along the length of the weld.

In testimony whereof I have hereunto set my hand.

OSCAR L. MILLS.